United States Patent Office 3,154,587
Patented Oct. 27, 1964

3,154,587
POLYOXYALKYLENE GLYCOL MONOETHERS OF HALOCYCLOALKENIC DERIVATIVES OF SALICYLALDEHYDES
John P. Luvisi, Park Ridge, Ill., assignor to Universal Oil Products Company, Des Plaines, Ill., a corporation of Delaware
No Drawing. Filed May 18, 1960, Ser. No. 29,818
6 Claims. (Cl. 260—600)

This application is a continuation-in-part of my copending application Serial No. 688,407 filed October 7, 1957, now abandoned.

This invention relates to new compositions of matter and to a method for the preparation thereof. More specifically the invention relates to a method of preparing polyoxyalkylene glycol monethers of a halocycloalkenic derivative of a salicylaldehyde.

Insecticidal compositions which are soluble in water and, in addition, are surface-active agents possess many advantages over the conventional type of insecticide. For example, advantages which may be found in having such an insecticide is the elimination of the need of an emulsifying agent when preparing an aqueous solution of the insecticide, as well as a reduction in the cost of the preparation of said solution. Furthermore, the solutions are surface-active and when used in detergent formulations will yield clean surfaces which will retain insecticide properties after the operation is completed.

It is therefore an object of this invention to prepare water-soluble, surface-active insecticidal compositions.

A further object of this invention is to prepare water-soluble, surface-active insecticidal compositions of matter comprising polyoxyalkylene glycol monoethers of halocycloalkenic derivatives of salicylaldehydes.

One embodiment of this invention resides in a process for the production of a polyoxyalkylene glycol monoether of a halocycloalkenic derivative of a salicylaldehyde which comprises condensing an alkenyl salicylaldehyde having the formula:

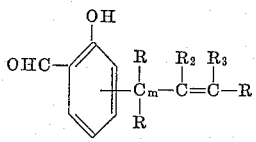

in which the R's are radicals selected from the group consisting of hydrogen and alkyl radicals containing from 1 to 6 carbon atoms and $m$ is an integer of from 0 to 6 with an unsaturated halogenated compound selected from the group consisting of (1) haloalkadienes having the generic formula:

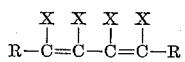

in which the X's are radicals selected from the group consisting of hydrogen and halogen radicals, at least 1 X being halogen and the R's are radicals selected from the group consisting of hydrogen and alkyl radicals containing from 1 to 6 carbon atoms, and (2) a halocycloalkadiene having the generic formula:

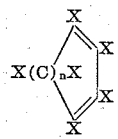

in which the X's are radicals selected from the group consisting of hydrogen and halogen radicals, at least 1 X being halogen and $n$ is an integer of from 1 to 2, at a temperature in the range of from about atmospheric to about 300° C. and at a pressure in the range of from about atmospheric to about 100 atmospheres, and reacting the resultant condensation product with an alkylene oxide at a temperature in the range of from about 50° to about 250° C. to form the desired polyoxyalkylene glycol monoether of a halocycloalkenic derivative of a salicylaldehyde.

A further embodiment of the invention resides in a process for the production of a polyoxyalkylene glycol monoether of a halocycloalkenic derivative of a salicylaldehyde which comprises condensing an alkenyl salicylaldehyde having the formula:

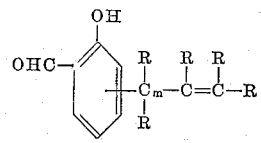

in which the R's are radicals selected from the group consisting of hydrogen and alkyl radicals containing from 1 to 6 carbon atoms and $m$ is an integer of from 0 to 6 with hexachlorocyclopentadiene at a temperature in the range of from about atmospheric to about 300° C. and at a pressure in the range of from about atmospheric to about 100 atmospheres, and reacting the resultant condensation product with an excess of an alkylene oxide at a temperature in the range of from about 50° to about 250° C. to form the desired polyoxyalkylene glycol monoether of a halocycloalkenic derivative of a salicylaldehyde.

Yet another embodiment of the invention is found in a polyoxyalkylene glycol monoether of a halocycloalkenic derivative of a salicylaldehyde selected from the group consisting of

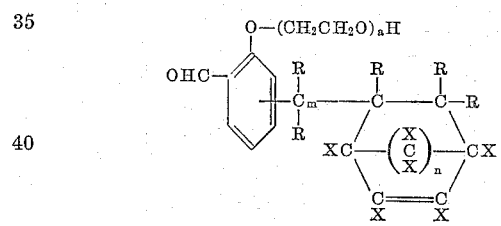

and

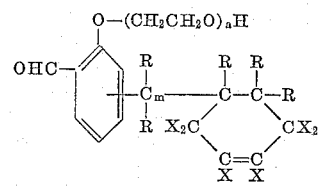

in which the R substituents are selected from the group consisting of hydrogen and alkyl radicals containing from 1 to 6 carbon atoms, the X's are radicals selected from the group consisting of hydrogen and halogen radicals, at least one X being halogen, $a$ in an integer of from about 2 to about 20, $m$ is an integer of from 0 to 6 and $n$ is an integer of from 1 to 2.

A specific embodiment of the invention resides in a process for the preparation of a polyoxyalkylene glycol monoether of a halocycloalkenic derivative of a salicylaldehyde which comprises condensing 4-allylsalicylaldehyde with hexachlorocyclopentadiene at a temperature in the range of from about 100° to about 225° C. and at a pressure in the range of from about atmospheric to about 100 atmospheres, reacting one molecular proportion of the resultant 4 - (1,2,3,4,7,7 - hexachloro-2-norbornen-5-ylmethyl)salicylaldehyde, with two molecular proportions of ethylene oxide at a temperature in the range of from about 50° to about 250° C., and recovering the resultant diethylene glycol monoether of 4-(1,2,3,4,7,7-hexachloro-2-norbornen-5-ylmethyl)salicylaldehyde.

Yet another specific embodiment of the invention is the diethylene glycol monoether of 3-(1,2-dichloro-1-cyclohexen-4-ylmethyl)salicylaldehyde.

Other objects and embodiments referring to alternative alkenyl salicylaldehydes, alternative haloalkadienes and halocycloalkadienes and to alternative alkylene oxides will be found in the following further detailed description of the invention.

As hereinbefore set forth it has now been discovered that polyoxyalkylene glycol monoethers of halocycloalkenic derivatives of salicylaldehydes may be prepared by condensing an alkenyl salicylaldehyde with a halo substituted straight-chain diolefin or cyclic diolefin and further condensing the resultant compound with an excess of alkylene oxide, the resultant ethers being soluble in aqueous solutions. The condensation between the alkenyl salicylaldehyde and the halo substituted diolefin of either the straight-chain or cyclic configuration was unexpected inasmuch as it could not be predicted that the diolefin would react with the alkenyl grouping attached to an aromatic ring which contains both an aldehydic and hydroxy substituent on the ring. The presence of the latter two substituents on the ring could have had an adverse effect on the condensation and the reactions such as polymerization or tar formation could have occurred due to the presence of these substituents. However, as hereinbefore set forth, the halo substituted diolefins reacted with the alkenyl substituent of the salicylaldehyde with the resultant formation of a halocycloalkenic derivative of a salicylaldehyde.

The compounds formed by the process of this invention will find a wide variety of use in the chemical field especially as insecticides, and more particularly as water-soluble, surface-active insecticides. For example, the condensation product which results from the reaction between hexachlorocyclopentadiene and 3-vinyl-salicylaldehyde, followed by condensing the resultant product with an excess of ethylene oxide, namely, the diethylene glycol monoether of 3 - (1,2,3,4,7,7 - hexachloro-2-norbornen-5-yl)salicylaldehyde is active as an insecticide, especially against houseflies. In addition, the reaction products of this invertion may also be used as intermediates in the preparation of resins, pharmaceuticals, plastics, etc. For purposes of this invention the term "halocycloalkenes" will refer to halocycloalkenes, polyhalocycloalkenes, halobicycloalkenes, and polyhalobicycloalkenes. In addition, the term "halo" will refer to both mono- and polyhalo compounds of the above type.

The process of this invention in which the halo substituted diolefin, either straight chain or cyclic, is condensed with the alkenyl salicylaldehyde will take place at a temperature in the range of from about atmospheric to about 300° C. or more, and often preferably at a temperature in the range of from about 100° to about 225° C., the temperature depending upon the reactants which are to be condensed. Generally speaking, the reaction will take place at atmospheric pressure; however, if higher temperatures than the boiling point of the reactants are to be employed, superatmospheric pressures ranging from about 2 to about 100 atmospheres will be used in the reaction, the amount of pressure used being necessary to maintain at least a portion of the ractants in the liquid phase. In addition, if so desired, the reaction will take place in the presence of inert organic solvents including aromatic solvents such as benzene, toluene, o-, m-, and p-xylene, ethyl benzene, etc.; alcohols such as methyl alcohol, ethyl alcohol, propyl alcohol, etc.; ethers such as dimethyl ether, diethyl ether, dipropyl ether, etc.; saturated aliphatic hydrocarbons such as pentane, hexane, heptane, etc.; or other organic solvents such as acetone, acetic acid, etc.

The condensation step between the reaction product of the haloalkadiene or halocycloalkadiene and the alkenyl salicylaldehyde and the excess of the alkylene oxide will also be effected at temperatures and pressures similar to those stated in the above paragraph, namely, at temperatures in the range of from about 50° to about 250° C. and at pressures ranging from about atmospheric to about 100 atmospheres or more, both temperature and pressure being dependent upon the particular reactants undergoing condensation. The reaction may also be effected with or without the presence of a weak basic catalyst such as sodium methoxide, potassium methoxide, magnesium methoxide, barium methoxide, calcium methoxide, etc. Also, the reaction may also take place in the presence of an inert organic solvent of the type hereinbefore set forth.

The desired water-soluble, surface-active insecticide will have the general formula:

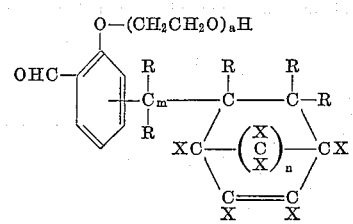

if a halocyclopentadiene is used, or the general formula:

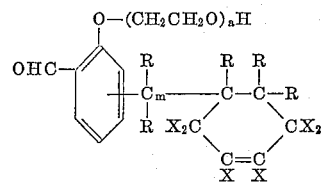

if a halobutadiene is used. In the above formulae the several R substituents are independently selected from the group consisting of hydrogen and alkyl radicals containing from 1 to 6 carbon atoms, the several X substituents are independently selected from the group consisting of hydrogen and halogen radicals having an atomic weight of from 35 to 127, $m$ is an integer of from 0 to 6, $n$ is an integer of from 1 to 2 and $a$ is an integer of from about 2 to about 20. The value of the integer $a$ in the above formulae will depend upon the mole ratio of the alkylene oxide to the condensation product of the reaction between the unsaturated side chain derivative of the salicylaldehyde and the halocycloalkadiene or haloalkadiene. For example, if "$a$" is 2 the mole ratio of alkylene oxide to the aforementioned condensation product is 2:1; if "$a$" is 3 the mole ratio of alkylene oxide is 3:1 and so on as "$a$" increases in size.

Unsaturated halogenated compounds containing only carbon, hydrogen and halogen atoms which may be reacted with the alkenyl salicylaldehyde in the process of the present invention include straight chain halogenated diolefins having the general formula:

$$R-\overset{X}{\underset{}{C}}=\overset{X}{\underset{}{C}}-\overset{X}{\underset{}{C}}=\overset{X}{\underset{}{C}}-R$$

in which each of the X radicals is independently selected from the group consisting of hydrogen and halogen radicals having an atomic weight of from 35 to 127 (i.e. chlorine, bromine or iodine) at least one X being halogen, and each of the R radicals is independently selected from the group consisting of hydrogen and alkyl radicals containing from 1 to 6 carbon atoms, or polyhalocycloalkadienes having the general formula:

$$X(C)_nX \begin{matrix} X \\ X \\ X \\ X \end{matrix}$$

in which X has the same meaning as above. Examples of these compounds include haloalkadienes such as 1-chloro-1,3-butadiene, 1,3-dichloro-1,3-butadiene, 1-bromo-1,3- butadiene, 1,3-dibromo-1,3-butadiene, 1,3-diiodo-1,3-butadiene, 2,3-dichloro-1,3-butadiene, 2,3-dibromo-1,3-butadiene, 2,3-diiodo-1,3-butadiene, 1,2,3-trichloro-1,3-butadiene, 1,2,3-tribromo-1,3-butadiene, 1-iodo-1,3-butadiene, 1,2-diiodo-1,3-butadiene, 1,2,3-triiodo-1,3-butadiene, 1,2,3,4-tetrachloro-1,3-butadiene, 1,2,3,4-tetrabromo-1,3-butadiene, 1,2,3,4-tetraiodo-1,3-butadiene, 1,3-dichloro-2-methyl-1,3-butadiene, 2-chloromethyl-1,3-butadiene, 1,4-dichloro-2-methyl-1,3-butadiene, 1,4-dichloro - 2 - chloromethyl-1,3-butadiene, 1,4-dichloro - 2 - dichloro-methyl-1,3-butadiene, 1,3-dibromo-2-methyl-1,3-butadiene, 1,4-dibromo-2-methyl-1,3-butadiene, 1,4-dibromo-2 - bromomethyl-1,3-butadiene, 1,4-dibromo-2-dibromomethyl-1,3-butadiene, 1,3-diiodo-2-methyl-1,3-butadiene, 1,4-diiodo-2-methyl-1,3-butadiene, 1,4-diiodo-2-iodomethyl-1,3-butadiene, 1,4-diiodo-2-diiodomethyl-1,3-butadiene, etc.; and halocyclolakadienes, such as halogenated 1,3-cyclopentadienes which for purposes of this invention will be designated as halogenated cyclopentadienes including 1-, 2-, or 5-chlorocyclopenadiene, 1,5-, 5,5-, 2,3-, 1,4-, 1,2-, or 1,3-dichlorocyclopentadiene, 1,5,5-, 1,2,5-, 1,3,5-, 1,2,4-, 2,5,5-, 1,4,5-, or 1,2,3-trichlorocyclopentadiene 2,3,5,5-, 1,2,3,5-, 1,2,4,5-, 1,2,3,4-, 1,3,5,5-, 1,2,5,5-, or 1,4, 5,5-tetrachlorocyclopentadiene, 1,2,3,5,5-, 1,2,4,5,5-, or 1,2,3,4,5 - pentachlorocyclopentadiene, hexachlorocyclopentadiene, the corresponding monobromocyclopentadienes, polybromocyclopentadienes, monoiodocyclopentadienes, polyiodocyclopentadienes, etc.; 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3 - cyclohexadiene, octaiodo-1,3-cyclohexadiene, etc. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadiene, 1-iodo-3-chloro-1,3-butadiene, 2 - bromo-3-chloro-1,3-butadiene, 1,3-dichloro-2-bromomethyl-1,3-butadiene, 1,3-dichloro-2-iodomethyl-1,3-butadiene, 1 - chloro-2-bromocyclopentadiene, 1,2-dichloro-3-bromocyclopentadiene, 1,2-dichloro-5,5-dibromocyclopentadiene, etc., may also be used although not necessarily with equivalent results.

Alkenyl salicylaldehydes containing only carbon, hydrogen and oxygen atoms and having the general formula:

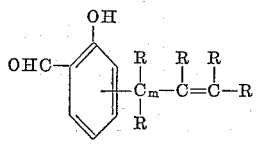

in which the several R groups are independently selected from the group consisting of hydrogen and alkyl radicals containing from 1 to about 6 carbon atoms and $m$ is an integer of from 0 to 6, include 3-vinylsalicylaldehyde, 3-allylsalicylaldehyde, 4-vinylsalicylaldehyde, 4-allylsalicylaldehyde, 3-methallylsalicylaldehyde, 4-methallylsalicylaldehyde, 3-crotonylsalicylaldehyde, 4-crotonylsalicylaldehyde, the isomeric 3- and 4-pentenyl, hexenyl, heptenyl, octenyl, nonyl, etc., salicylaldehydes such as, for example, 3-pentenylsalicylaldehyde, 3-(2-methyl-4-pentenyl)salicylaldehyde, 4-hexenylsalicylaldehyde, 4-(3-methyl-2-pentenyl)salicylaldehyde, 3-heptenylsalicylaldehyde, 3-(4-methyl-5-hexenyl)salicylaldehyde, 4 - octenylsalicylaldehyde, etc. It is to be understood that the aforementioned haloalkadienes, halocycloalkadienes and the alkenyl salicylaldehydes are only representatives of the class of compounds which may be used and that this invention is not necessarily limited thereto.

Alkylene oxides which may be used in the process of this invention comprise ethylene oxide, 1,2-propylene oxide, 2,3-butylene oxide, 1,2-pentene oxide, 2,3-pentene oxide, etc., the preferred oxides comprising ethylene oxide and propylene oxide due to their relatively greater availability and lower cost.

The volatility of the insecticides produced according to this invention is usually dependent upon its molecular weight and when a product having low volatility is especially desired in a particular application, such as a high degree of retentivity or activity to which the pesticide is applied, advantage may be taken of the fact that the products of the first step of the present invention having a relatively high molecular weight also possess relatively higher boiling points than do the products having low molecular weights, and thus may be the preferred reactants for the production of such composition.

The physical properties of the present polyoxyalkylene glycol monoethers of a halocycloalkenic derivative of a salicylaldehyde, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison of the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticide of the present invention may be combined with water or other diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be as low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration and also whether or not the insecticide is dissolved in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of this invention may be effected in any suitable manner and may comprise either a batch or a continuous type operation. For example, when a batch type operation is used a quantity of the starting materials comprising an alkenyl salicylaldehyde, the halo substituted alkadiene or halo substituted cycloalkadiene and, if so desired, an inert organic solvent is placed in a condensation apparatus provided with heating and mixing means. The flask is then heated to the desired temperature and pressure and maintained thereat for a predetermined period of time, at the end of which time the flask and contents thereof are allowed to cool to room temperature. The desired intermediate condensation product is separated from unreacted starting materials by conventional means such as, fractional distillation, crystallization, etc. Alternatively, the alkenyl salicylaldehyde and the solvent, if any, may be heated to the desired reaction temperature and the halo substituted alkadiene or halo substituted cycloalkadiene may be added gradually. The intermediate condensation product of the aforementioned reaction is then placed in a separate flask or, if so desired, may be returned to the original reaction apparatus and admixed with a molecular excess of alkylene oxide. The flask and contents thereof are then heated to the desired reaction temperature and, as in the first step of the process of this invention, maintained thereat for a suitable residence time. At the end of this time the flask and contents thereof are then cooled to room temperature and the desired reaction product, comprising a polyoxyalkylene glycol monoether of a halocycloalkenic derivative of a salicylaldehyde is separated, purified and recovered by the conventional means hereinbefore set forth.

Another method of effecting the condensation reaction of the present invention is by a continuous type operation. In this type of operation the starting materials comprising the alkenyl salicylaldehyde and the halo substituted alkadiene or halo substituted cycloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite and the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and continuously charged to a second reactor, while the unreacted starting materials are separated and recharged to the first reactor as a portion of the feed stock. After being charged to the second reactor the intermediate condensation product is condensed with a mole excess of an alkylene oxide which has been continuously charged to the second reactor, also maintained at suitable operating conditions of temperature and pressure, through a separate line. The desired condensation product, comprising the polyoxyalkylene glycol monoether of a halocycloalkenic derivative of a salicylaldehyde is separated and purified by means similar to those hereinbefore set forth.

Examples of compounds which may be prepared according to this process include the diethylene glycol monoethers of 3-(1,2-dichloro-1-cyclohexen-4-ylmethyl)salicylaldehyde,
4-(1,2-dichloro-1-cyclohexen-4-ylmethyl)salicylaldehyde,
3-(1,2-dichloro-1-cyclohexen-4-yl)salicylaldehyde,
4-(1,2-dichloro-1-cyclohexen-4-yl)salicylaldehyde,
3-(1,2,3-trichloro-1-cyclohexen-4-ylmethyl)salicylaldehyde,
4-(1,2,3-trichloro-1-cyclohexen-4-ylmethyl)salicylaldehyde,
3-(1,2,3-tribromo-1-cyclohexen-4-ylmethyl)salicylaldehyde,
4-(1,2,3-tribromo-1-cyclohexen-4-ylmethyl)salicylaldehyde,
3-(1,2,3-trichloro-1-cyclohexen-4-ylmethyl)salicylaldehyde,
3-(1,2,3-tribromo-1-cyclohexen-4-yl)salicylaldehyde,
3-(1,2,3,4,7,7-hexachloro-2-norbornen-5-ylmethyl)salicylaldehyde,
4-(1,2,3,4,7,7-hexachloro-2-norbornen-5-ylmethyl)salicylaldehyde,
3-(1,2,3,4,7,7-hexachloro-4-norbornen-5-yl)salicylaldehyde,
4-(1,2,3,4,7,7-hexachloro-4-norbornen-5-yl)salicylaldehyde,
3-(1,2,3,4,7,7-hexabromo-2-norbornen-5-ylmethyl)salicylaldehyde,
4-(1,2,3,4,7,7-hexabromo-2-norbornen-5-ylmethyl)salicylaldehyde,
3-(1,2,3,4,7,7-hexabromo-4-norbornen-5-yl)salicylaldehyde, etc;

the triethylene glycol monoethers, the tetraethylene glycol monoethers, the pentaethylene glycol monoethers, the hexaethylene glycol monoethers of the above mentioned compounds, etc.; the dipropylene glycol monoethers, the tripropylene glycol monoethers, the tetrapropylene glycol monoethers, etc. of the aforementioned compounds, etc.

The following examples are given to illustrate the process of the present invention which, however, are not intended to limit the generally broad scope of the present invention in strict accordance therewith.

*Example I*

A mixture of 27 g. (0.1 mole) of hexachlorocyclopentadiene and 16 g. (0.1 mole) of 3-allylsalicylaldehyde dissolved in 50 g. of toluene was refluxed at a temperature of about 110° C. for a period of about 5.5 hours during which time the inert solvent, toluene, was distilled over until the reaction temperature reached a maximum of 225° C. The reaction vessel and contents thereof were cooled to room temperature and the reaction product was recovered, washed, dried and distilled under reduced pressure. Eleven grams of a viscous liquid boiling at approximately 390° C. was recovered, said liquid crystallized upon standing. The product was recrystallized from alcohol and recovered, the purified product comprising 3 - (1,2,3,4,7,7-hexachloro-2-norbornen-5-ylmethyl)-salicylaldehyde having a melting point of 101° C.

A molecular proportion of the above compound and two molecular proportions of ethylene oxide are placed in a reaction vessel and heated to a temperature of about 110° C. The flask and contents thereof are maintained at this temperature for a period of about 3 hours at the end of which time the flask and contents thereof are allowed to cool to room temperature. The reaction product is washed with pentane, dried and fractionally distilled under reduced pressure, the desired product, comprising the diethylene glycol monoether of 3-(1,2,3,4,7,7-hexachloro-2-norbornen-5-ylmethyl)salicylaldehyde being sepated and recovered therefrom.

*Example II*

A solution of 13 g. (0.1 mole) of 2,3-dichloro-1,3-butadiene and 16 g. (0.1 mole) of 3-allylsalicylaldehyde dissolved in 50 g. of benzene is heated under reflux for about 6 hours after which time the product, comprising 3-(1,2-dichloro-1-cyclohexen-4-ylmethyl)salicylaldehyde is recovered and treated as described in Example I above. One molecular proportion of this compound is reacted with 2 molecular proportions of ethylene oxide as hereinbefore described and the desired condensation product, comprising the diethylene glycol monoether of 3-(1,2-dichloro-1-cyclohexen-4-ylmethyl)salicylaldehyde is separated and recovered.

*Example III*

A solution of 13 g. of 2,3-dichloro-1,3-butadiene and 15 g. of 3-vinylsalicylaldehyde in 50 g. of xylene is heated under reflux for a period of about 5 hours during which time the xylene is distilled over until the reaction temperature reaches a maximum of about 225° C. At the end of this time the flask and contents thereof are cooled to room temperature and the reaction product is recovered, washed, dried and subjected to fractional distillation under reduced pressure. One molecular proportion of this compound is reacted with two molecular proportions of ethylene oxide as hereinbefore described and the desired product, comprising the diethylene glycol monoether of 3-(1,2-dichloro-1-cyclohexen-4-yl)salicylaldehyde is separated therefrom.

*Example IV*

A solution of 27 g. (0.1 mole) of hexachlorocyclopentadiene and 16 g. (0.1 mole) of 4-vinylsalicylaldehyde dissolved in 50 g. of toluene is treated as hereinbefore set forth. One molecular proportion of the condensation product, comprising 4-(1,2,3,4,7,7-hexachloro-2-norbornen-5-yl)salicyaldehyde is treated with 2 molecular proportions of ethylene glycol as hereinbefore set forth and the desired product comprising the diethylene glycol monoether of 4-(1,2,3,4,7,7-hexachloro-2-norbornen-5-yl)salicylaldehyde is separated and recovered.

*Example V*

A solution of 14 g. (0.1 mole) of 1,4-dichloro-2-methyl-1,3-butadiene and 16 g. (0.1 mole) of 4-vinylsalicylaldehyde dissolved in 50 g. of toluene is refluxed for a period of about 5 hours during which time the toluene is distilled over until the reaction temperature reaches a maximum of about 225° C. At the end of this time the flask and contents thereof are cooled to room temperature and the reaction product is recovered, washed, dried and subjected to fractional distillation under reduced pressure. One molecular proportion of this compound comprising 4-(2,5-dichloro-6-methyl-1-cyclohexen-4-yl) salicylaldehyde is reacted with two molecular proportions of ethylene oxide as hereinbefore set forth and the desired product, comprising the diethylene glycol monoether of 4-(2,5-dichloro-6-methyl-1-cyclohexen-4-yl)salicylaldehyde is separated and recovered.

*Example VI*

An insecticidal solution is prepared by dissolving 1 g. of the diethylene glycol monoether of 3-(1,2,3,4,7,7-hexachloro-2-norbornen-5-ylmethyl)salicylaldehyde in 100 cc. of water. This solution is sprayed into a cage containing common houseflies and causes a 100% knockdown.

Similar tests with other insecticides of Examples II to V show that these compounds, like the compound of Example I, show a markedly superior knock-down ability with essentially equal killing power as compared to insecticides containing only halogen substituents.

I claim as my invention:

1. A polyoxyalkylene glycol monoether of a halocycloalkenic derivative of a salicylaldehyde selected from the group consisting of

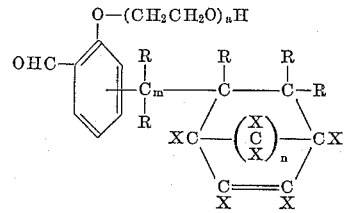

and

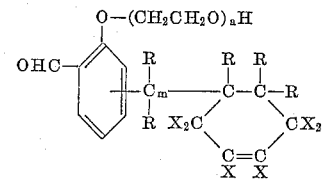

in which the R substituents are selected from the group consisting of hydrogen and alkyl radicals containing from 1 to 6 carbon atoms, the X's are radicals selected from the group consisting of hydrogen and halogen radicals, at least one X being halogen, $a$ is an integer of from about 2 to about 20, $m$ is an integer of from 0 to 6 and $n$ is an integer of from 1 to 2, the halocycloalkenic moiety of said monoether being in one of the positions 3 and 4 relative to the formyl group on the benzene ring.

2. The diethylene glycol monoether of 3-(1,2-dichloro-1-cyclohexen-4-ylmethyl)salicylaldehyde.

3. The diethylene glycol monoether of 4-(1,2-dichloro-1-cyclohexen-4-yl)salicylaldehyde.

4. The diethylene glycol monoether of 4-(1,2,3,4,7,7-hexachloro-2-norbornen-5-ylmethyl)salicylaldehyde.

5. The diethylene glycol monoether of 4-(1,2,3,4,7,7-hexabromo-2-norbornen-5-ylmethyl)salicylaldehyde.

6. The diethylene glycol monoether of 4-(2,5-dichloro-6-methyl-4-yl)salicylaldehyde.

References Cited in the file of this patent

UNITED STATES PATENTS 2,616,930     Schmerling _____ Nov. 4, 1952